Patented June 2, 1953

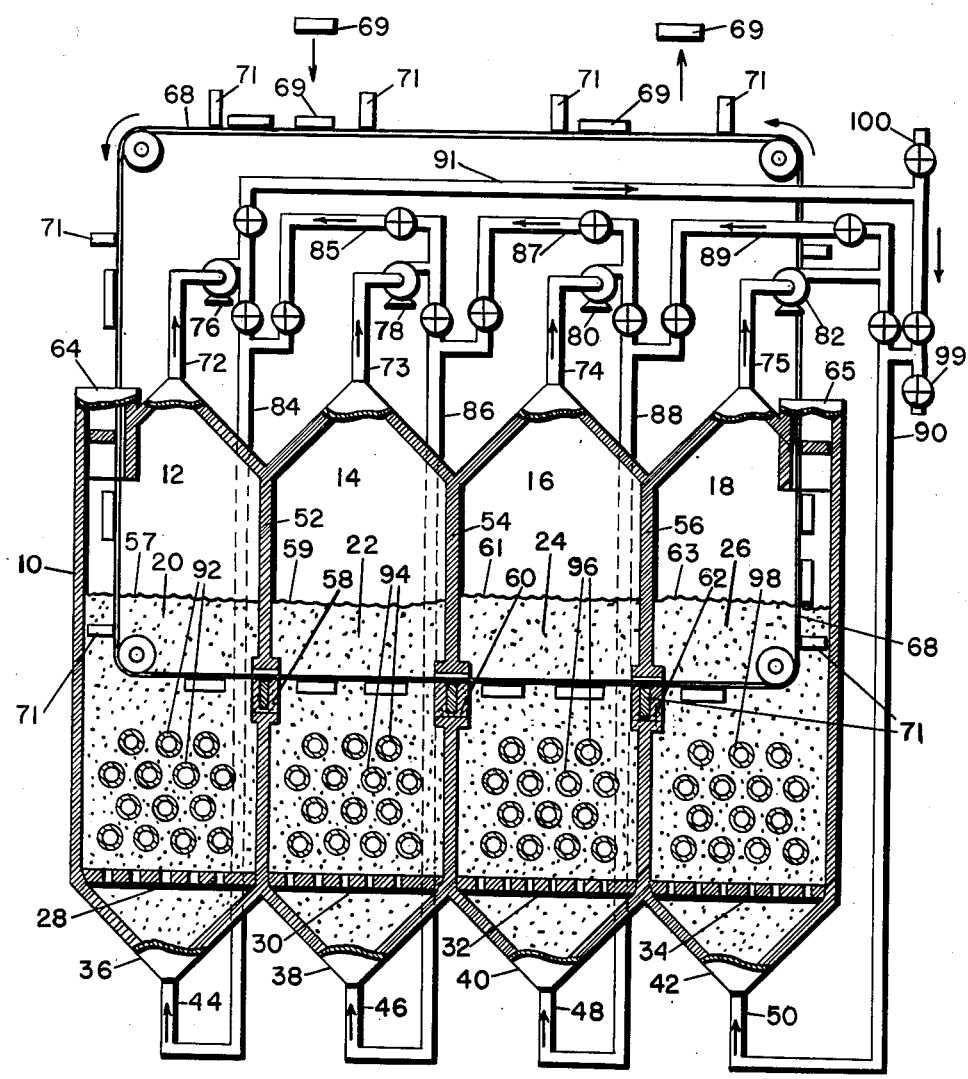

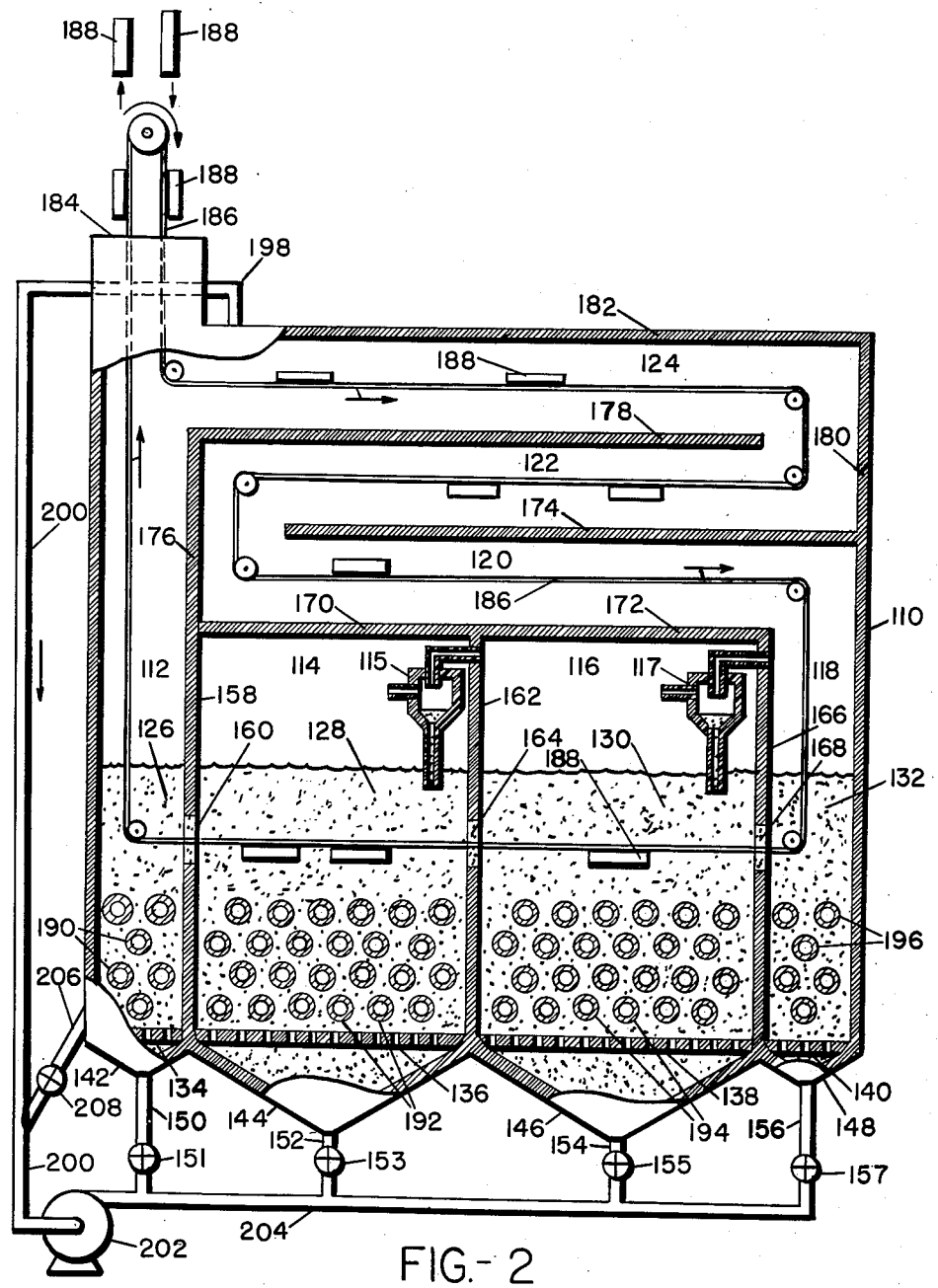

2,640,333

UNITED STATES PATENT OFFICE 2,640,333

METHOD OF QUICK-FREEZING FOODSTUFFS

Bradford E. Bailey, Elizabeth, N. J.

Application November 15, 1950, Serial No. 195,792

16 Claims. (Cl. 62—173)

The present invention relates to an improved method for freezing foodstuffs. It is more particularly concerned with the rapid removal of heat from foodstuffs or the so called "quick" freezing of foodstuffs.

In accordance with the present invention, a foodstuff is quick-frozen by bringing it into contact with relatively small sized solids which are maintained below the freezing temperature of the foodstuff.

Factors which are encountered in practically all commercial methods for freezing foods are enumerated and discussed below. Five such factors which are considered important are namely, (1) the effect of freezing rate on ice crystal size, (2) the effect of freezing rate on freeze concentration of solutions within foods, (3) the magnitude and effect of moisture loss from the foods, (4) the effect of heat transfer coefficients on refrigeration efficiency, (5) the effect of freezing rate on the size and cost of the freezing chamber.

Some quick freezing methods for freezing unpackaged foods are advantageous with respect to one or more of these factors. However I will attempt to show that my method is the only one which is advantageous in regard to all five factors.

(1) The size of the individual ice crystals formed within the foodstuff decreases as the speed of freezing is increased. This has been confirmed by various investigators through the use of photomicrographs of cross sections of frozen foodstuffs which have been frozen at different speeds.

In one study, in which asparagus was frozen by the sugar solution immersion, quick freeze method, it was found that the ice crystals measured 9 x 13 x 30 microns in size. In this same study, in which the asparagus was frozen by the only moderately fast 0° F. air-blast method, the ice crystals measured 324 x 544 x 920 microns (or .013 x .0218 x .037 inch) in size.

It was believed by these investigators that the larger ice crystals, produced by the slower freezing methods, damage the plant tissues, since the cell walls of plant tissues are composed of relatively inelastic cellulose. In fact some plant tissues, bleed, wilt, and collapse even when frozen by the fastest of the present commercial methods. These plant tissues most difficult to satisfactorily freeze are generally those containing very high percentages of water. For example lettuce, cucumbers, and celery become flabby upon thawing and tomatoes collapse completely; while the lower water content foods such as lima beans, peas, corn, and string beans can be successfully frozen.

The water content of the foods mentioned plus some others are given below in Table I.

TABLE I

*Water content of fruits and vegetables*

| Foodstuff | Percent Water |
|---|---|
| Cucumbers | 95.5 |
| Tomatoes | 94.5 |
| Celery | 94.5 |
| Asparagus | 94 |
| Strawberries | 90.5 |
| Lettuce | 89 |
| Carrots | 88 |
| Peaches | 88 |
| Berries (general) | 84 |
| String beans | 83 |
| Corn | 75.5 |
| Peas | 75 |
| Lima beans | 69 |

In the freezing of meats, studies similar to those on vegetables using photomicrographs, show that fast freezing rates produce many thin veins of ice; whereas slow freezing rates produce a few thick veins of ice. It was also observed in the freezing of a round of beef that the fast frozen (½ hr.) outer tissues were light red in color, approaching the color of unfrozen lean meat. In comparison the slowly frozen (8 hrs.) center tissues were dark red in color, and were therefore less attractive.

(2) The dehydration of the cells by freeze concentration decreases as the speed of freezing increases. Photomicrographs of frozen cut sections show that the slower freezing rates not only favor the formation of large crystals but that the ice appears as frozen veins outside the partially dehydrated and shrunken tissue solids.

An explanation of this factor is that both plant and animal tissues are composed of a multitude of individual cells, in and around which is a complex liquid containing numerous mineral salts, vitamins, proteins, and other substances in solution or suspension. As the temperature is brought below 32° F., numerous physical and physico-chemical changes take place. One of the most important of these changes is the progressive formation of ice crystals as the temperature decreases. A very large percentage of the total water is changed to ice between 31° and 25° F., and this has become known as the zone of maximum crystal formation. As a result of the above freezing concentration of the liquid, osmosis causes water from the cells to migrate from the less concentrated solution in the cells to the more concentrated solutions outside.

If on thawing, the cell can not reabsorb its original moisture, it is said to be irreversibly or chemically denatured. "Leakage" is the term applied to water which is not reabsorbed. As a rule leakage from plant tissue which has been frozen and thawed is greater than from animal tissue. Quick freezing is therefore essential to the production of frozen fruits and vegetables of the highest quality, although certain cold pack fruits to which sugar has been added prior to freezing may be of good quality, if frozen very slowly to permit the sugar to penetrate the fruit tissue before freezing is completed.

In some experiments along this line by Moran, a gelatin solution was frozen and thawed. The quick frozen gelatin tended to return to its state as a thin gel, but the slowly frozen material consisted of partially dehydrated gelatin and water.

(3) A third important factor in the freezing of foodstuffs is the avoidance of moisture loss from the surface of the food. Such desiccation is commonly known as "freezer burn." With poultry, freezer burn is responsible for the bleached, chalky, mottled appearance. Pocklike marks appear on the surface of the poultry, particularly around the feather follicles, owing to uneven drying out. Meats lose their "bloom" or fresh moist appearance and there is usually a bleaching of the color of the surface flesh. Even in vegetables, such as peas, there is some color and flavor change.

It is pointed out that a 5 percent moisture loss from a material having a value of 15 cents a pound may amount to over double the cost of removing the heat from the product. Water evaporated from the product is deposited as frost on the cooling coils in most of the present type freezers.

(4) A fourth important factor in the freezing of foodstuffs is the efficiency of the method of removing heat from the standpoint of the refrigeration system. In other words it is possible for two different methods of freezing foodstuffs to remove equal quantities of heat in equal periods of time and yet for one method to require smaller refrigeration compressors and less power. For example, suppose that method A requires that the refrigerant in the evaporating coils be maintained at −40° F. to freeze a foodstuff to 0° F. and that method B will freeze the same foodstuff to 0° F. while maintaining the evaporating temperature at −10° F. Method B requires a smaller compressor due to smaller volume of the refrigerant vapor at the suction and also it uses less power.

(5) A fifth important factor involved in the freezing of foodstuffs is the size of the freezing chamber. In this regard it has been stated that a major reason for the commercial quick freezing of foodstuffs is economy in production on a large scale. Thus, if the freezing time is reduced by one-half the amount of food which must be accommodated in the freezing chamber is half as great and the freezing chamber is approximately half as large for the same throughput. Such reduction in size, reduces the initial cost and overhead of the plant.

At the present time there are a number of methods employed commercially for freezing foodstuffs. In evaluating these methods, it is evident that emphasis is placed on increased freezing rate, less desiccation, and higher refrigerating efficiency. These points were discussed in the preceding paragraphs in connection with five important factors encountered in the freezing of foodstuffs. A few of the more common and pertinent freezing methods are discussed below and a few of their shortcomings mentioned.

Cold air with natural convection is one of the oldest methods of freezing foodstuffs. By this method the foodstuff to be frozen is placed on racks in a compartment, the walls and ceiling of which are lined with cooling pipes or the racks themselves may be cooling pipes. The air then circulates by natural convection, being cooled by the brine pipes and in turn cooling the foodstuff. The principal disadvantage of this method is the slowness of freezing due to the very poor heat transfer coefficients existing between the air and the surface of the foodstuff and the surface of the cooling coils.

The use of forced convection air in a compartment of the same type as the natural convection method is a second general method, which is widely employed. In this manner heat transfer rates and consequently freezing rates are much improved, but are still not good. Both of the above mentioned methods require that a large amount of cooling coil surface be installed in the freezing compartment, possibly 1 sq. ft. of surface for every 2 to 4 cu. ft. of space. Frost accumulates on the surface of the cooling coils and is particularly difficult to remove due to the large number and wide distribution of such cooling coils.

The tunnel freezer, another type of forced convection freezer, consists of a tunnel through which cold air is circulated. In one type small trucks carrying the foodstuff are passed in one end and out the other. The tunnel is made sufficiently long to accommodate several trucks and each truck remains in the tunnel sufficient time to complete the freezing. In another type the food is conveyed on a wire mesh belt continuously through the tunnel. In this manner the power required at the air blower to circulate the air is more efficiently utilized in raising heat transfer rates from the coils to the air and from the air to the foodstuff. However, even in this method the convection heat transfer rates severely limit the freezing rates to below those obtainable by other methods.

A further shortcoming of all of the above methods, wherein the food is cooled by air, is the desiccating effect of the unsaturated air. This is particularly harmful to unpackaged or poorly packaged foodstuffs. It is during the initial stages of cooling that moisture loss from the foodstuff is most severe. This is due to the higher temperature of the surface of the foodstuff in the initial cooling period and the fact that the vapor pressure of water increases rapidly with an increase in temperature as seen in Table II below.

TABLE II

*Effect of temperature on the water vapor pressure and water content of saturated air*

| Temperature, °F. | Vapor Pressure of Water, inches of Mercury, Absolute | Water Content of Saturated Air, Lbs. water/100 cubic feet of air at 14.7 p. s. i. a. |
|---|---|---|
| −40 | .0039 | .00077 |
| −20 | .0126 | .00236 |
| 0 | .0377 | .00676 |
| +20 | .103 | .0178 |
| +40 | .248 | .0412 |
| +60 | .522 | .0845 |

It is evident from Table II that if the surface of the food were at +40° F. and the cooling air were at −20° F., the vapor pressure of the water on the surface of the foodstuff would be about 20 times greater than the vapor pressure of the water in the air at −20° F. As a result the air, warmed through coming into contact with the food, would have a great drying effect, even though it were saturated prior to contact with the food. After the surface of food is cooled to 0° F., the vapor pressure of the water on its surface is only 3.5 times greater than the vapor pressure of the water in the −20° F. air and the drying effect is reduced. Forced convection reduces the temperature at the surface of the food faster but this is counteracted to a large extent by the fact that the high velocity air has a greater "wiping" action on the surface moisture and that a greater total quantity of air usually passes over the foodstuff.

Moisture loss in cold air freezing processes is reduced by reducing not only the temperature increase in the freezer, as mentioned, but by operating at the lowest practical temperature level. For example, if air entered the freezer saturated at −40° F. and left saturated at −20° F., it would absorb 0.0016 lb. of water from the food per 100 cubic feet of air. On the other hand, if the air entered saturated at −20° F. and left saturated at 0° F., it would have absorbed 0.0044 lb. of water per 100 cubic feet of air. As a result the −20 to 0° F. air would have absorbed about 3 times as much water from the food as the −40° to −30° F. air. The use of lower temperature levels requires larger refrigeration compressors and more power to run them and is therefore not justified only to reduce moisture loss.

Furthermore, in regard to the desiccating effect of air in many of the cruder forced convection freezers, the moisture loss amounts to 5 to 8 percent of the weight of such products as shelled peas. Such moisture loss also almost wholly removes the protective film of surface water, thereby increasing the danger of "freezer burn" during subsequent storage. Even a 5 percent moisture loss from a material having a value of 15 cents per pound may amount to much more than double the cost of freezing the product.

Various improvements have been made in the air-blast method to help overcome the drying effect of the air. In the Finnegan process, the freezing is carried out in successive stages so that the temperature of the cooling coils and of the air in each successive stage is lower. Thus the temperature differential between the cooling coil and the foodstuff is maintained low. This decreases moisture loss and also increases refrigeration efficiency. A further proposal to maintain high relative humidity has been to spray water into the air stream at successive locations. This has the disadvantage that the added moisture quickly freezes on the refrigerating coils. In order to avoid such frost deposition, a concentrated salt or ethylene glycol solution may be passed over the coils, which will absorb moisture. This, however, requires that the water be subsequently removed from this solution by some means.

Freezing by direct contact of the foodstuff with an edible liquid refrigerant was one of the earliest means of quick freezing. As early as 1842 a patent was granted in England to H. Benjamin for freezing foods by immersion in an ice and salt brine. In one type of process the food is placed on racks which are immersed in a tank of the refrigerant and the refrigerant is then circulated past the food.

In another type of direct contact immersion apparatus developed by R. B. Taylor in 1939, the foodstuff is carried through a tank of invert sugar syrup by a wire mesh conveyor. The syrup is maintained at about 8 to 10° F. and freezes articles the size of strawberries in from 6 to 10 min. After the products have emerged from the tank, the excess syrup adhering to them is removed by centrifuging.

In still other types of direct contact apparatus sprays and fogs of cold brine and syrup are projected against the foodstuff. Examples are the tunnel type spray freezer patented by H. T. Taylor in 1923 and the fog freezer patented by M. T. Zarotschenzeff in 1933. In the spray freezer, fish were first passed through a fresh water shower, then through a sodium chloride brine at about 10° F., and finally through a fresh water spray which was to wash off the surplus brine and place an ice glaze on the fish.

Advantages of the liquid direct contact method are as follows:

a. It is possible to secure a high heat transfer rate from a moving liquid to a solid, thereby permitting rapid freezing rates.

b. A liquid refrigerant will contact intimately every portion of the surface of an irregularly shaped object.

c. Cooling coils immersed in a liquid refrigerant do not become coated with non-heat conductive frost.

d. The loss of moisture from the food is not as great as is likely in freezing unpackaged foods by cold air.

e. Individual pieces of food are frozen separately so that they can be used in what ever quantity desired.

Disadvantages of the direct contact method have been so severe that this method is used today for freezing only a small part of the total production of frozen foods. Some of these disadvantages are as follows:

(a) When using brine, salt penetrates the food by osmosis. This salt catalyses undersirable changes during storage. Also the salt concentration in the food may increase to such a point as to make the food unpalatable.

(b) Juices are extracted from the food by osmosis which then contaminate and dilute the refrigerant, necessitating frequent purification thereof.

(c) Most refrigerants suitable for this use are so viscous at low temperatures that they are difficult and expensive to circulate at the necessary velocities. If such viscous liquid is passed over food at insufficient velocity the heat transfer rate is greatly reduced.

The effect of viscosity and velocity of liquid refrigerant on freezing rate is shown in Table III below.

TABLE III

| Solution | Viscosity, Centipoises | Velocity, Inches/Sec. | Freezing Time, Minutes |
|---|---|---|---|
| 58% Syrup | 725 | 0 | 13.0 |
| Do | 725 | 2 | 5.0 |
| Do | 725 | 4 | 2.5 |
| 22% Syrup | 10 | 0 | 5.5 |
| Do | 10 | 2 | 3.7 |
| Do | 10 | 4 | 2.4 |

The main object of my invention is to freeze irregularly shaped, unpackaged foodstuffs at a rapid rate with negligible desiccation and with no undesirable contamination of the foodstuff.

A further object is to freeze foodstuffs with high heat transfer coefficients from the cooling coils to the freezing medium and from the freezing medium to the foodstuff, or in other words with efficient utilization of refrigeration.

A still further object is to freeze irregularly shaped foodstuffs by the direct contact method without contamination when the package around the food is imperfect and is not impervious to the contacting medium.

A still further object is to avoid the formation of ice or frost on the refrigerating coil cooling the direct contact cooling medium.

Other objects will appear from the following description and from the drawings.

For illustrative purposes, the invention will be described with specific reference to the quick freezing of foodstuffs, it being understood that the invention will have more general application.

For a fuller understanding of the invention, reference will now be made to the accompanying drawings, wherein:

Figure 1 represents a view of a freezing chamber wherein the foodstuff is immersed in a bed of granular ice in a densely fluidized condition.

Figure 2 represents a modification of my invention wherein the foodstuff is first chilled with cold air and then immersed in a bed of granular ice maintained in a densely fluidized condition.

Referring to Figure 1, reference character 10 represents a vertical cross sectional view of a freezing chamber. This chamber contains separate compartments 12, 14, 16, and 18 which have beds of densely fluidized ice particles 20, 22, 24 and 26. At the lower ends of the compartments there are distribution grids 28, 30, 32, and 34 and sloped bottoms 36, 38, 40 and 42, and conduit inlet connections 44, 46, 48 and 50.

The intermediate compartments are separated from each other by walls 52, 54, and 56. These walls are solid or nonporous except for openings 58, 60, and 62. These said openings are entirely below the upper surfaces 57, 59, 61 and 63 of the beds of densely fluidized ice particles. One or more such opening is situated in each wall. The two end compartments have openings 64 and 65 which are above the surface of the beds of solids and which are open to the atmosphere.

One or more continuous wire mesh belt conveyors 68, carrying foodstuff 69 pass into the freezing chamber 10 and through opening 64, bed 20, opening 58, bed 22, opening 60, bed 24, opening 62, bed 26, and emerge from chamber 10 through opening 65. They then pass externally to chamber 10 and reenter opening 64.

Conveyor belt 68 is fitted with a multiple number of solid or non-porous sheets 71 which are spaced at a distance equal to the width of the individual compartment, the compartments being of equal width in this arrangement. These said sheets completely fill the openings 58, 60, and 62 in the walls 52, 54, and 56 and are preferably made of a material which will be flexible at the lowest bed temperatures, such as rubber.

In operation the said conveyor belt fitted with sheets 71 is moved intermittently through increments of distance equal to the width of a compartment and is brought to rest with the said sheets closing said openings in said walls. In this position the foodstuff being frozen will be within the individual compartments. This arrangement has the advantage that intermixing of ice particles between compartments is less than if the said sheets 71 were not employed. To further reduce intermixing between compartments it is preferable that the movement of the foodstuff in said increments from compartment to compartment be rapid.

The elevations of the upper surfaces of the beds of ice particles in each compartment are substantially the same. This is due to the fluid like properties of the fluidized ice particles which causes them to seek a common elevation.

It would be entirely possible to operate without the sheets 71, especially if temperature changes from bed to bed were not great. Also the openings could be made elongated in order to reduce intermixing between beds. The conveyor belt with this arrangement would travel at a constant uniform rate through the freezing chamber.

The beds of ice particles are maintained in a densely fluidized condition by passing gasiform fluid upwardly through each bed at fluidizing velocities. Such gasiform fluid is one which is non-toxic and not chemically reactive with water such as air, nitrogen, or carbon dioxide. The said gasiform fluid enters the compartments 12, 14, 16 and 18 through connections 44, 46, 48 and 50; passes upwardly through fluidized ice beds 20, 22, 24 and 26; is withdrawn above said beds through lines 72, 73, 74 and 75; raised in pressure by means of compressors 76, 78, 80 and 82; passed through lines 84, 86, 88 and 90, and recycled to the bottoms of the compartments to inlet connections 44, 46, 48 and 50.

Cooling tubes 92, 94, 96 and 98 are located in each bed of fluidized ice particles and they contain a refrigerant such as vaporizing ammonia or vaporizing propane.

Such cooling tubes immersed in a bed of densely fluidized solids are very efficient in refrigerating the solids. It is well known in the art of fluidized solids that high heat transfer rates between fluidized solids and another surface are secured under suitable conditions. Accordingly in my invention I employ ice particles preferably in the size range of 20 to 200 microns and I employ a sufficiently high superficial gas velocity such as 1 to 3 feet per second to produce a highly turbulent degree of fluidization. Larger and smaller size particles may of course be employed together with suitable gasiform fluid velocities. While such conditions would not give as high rates as for the preferable size range, they would give higher rates than if no solids were present.

Ice particles entrained from the surface of the turbulently fluidized bed of ice particles are withdrawn from the compartments through lines 72, 73, 74 and 75 and passed through the said compressors along with the gasiform fluid and recycled to the bottoms of the dense beds through gasiform fluid inlet connections 44, 46, 48, and 50. It is preferable that the compressor rotor be of heavy cast iron construction in order that it may better withstand wear or it may be lined with rubber to reduce erosion from the granular ice.

In an alternate arrangement at least a portion of the fluidizing gasiform fluid from compartment 18 is passed into compartment 16 through lines 75, 89, 88, and 48. Likewise, at least a portion of the fluidizing gasiform fluid from compartment 16 is passed into compartment 14 through lines 74, 87, 86, and 46. Likewise at least a portion of the fluidizing gasiform fluid from compartment 14 is passed into compartment 12 through lines 73, 85, 84, and 44. In a similar manner at least a portion of the gasiform fluid from compartment 12 is recycled back to compartment 18 through lines 72, 91, 90, and 50. The advantage of this arrangement is that at least a portion of the fluidizing gasiform fluid is passed serially through the compartments countercurrent to the passage of the foodstuff serially through the compartments and as a result the advantages of countercurrent heat transfer between at least a portion of the fluidizing gasiform fluid and the foodstuff is secured. In other words, the temperature of the gasiform fluid increases in passing from compartment 18 to compartment 13 and the temperature of the foodstuff decreases in passing from compartment 12 to compartment 18. Gasiform fluids may be introduced through line 99 and removed from the system through line 100 if so desired.

Recycling of entrained ice with the gasiform fluid as described in the previous paragraph is particularly advantageous in that it greatly reduces the temperature rise of the gasiform fluid due to compression. Table IV below shows the temperature rise on compression for various $\Delta P$'s and ice contents.

| Case | 1 | 2 | 3 | 4 | 5 | 6 |
|---|---|---|---|---|---|---|
| $\Delta P$ of compressor, p. s. i. | 1 | 1 | 2 | 2 | 1 | 1 |
| Ice content of air at compressor suction, #/C. F. | 0 | 0.1 | 0 | 0.1 | 2 | 5 |
| $\Delta t$ of air+ice on compression (at 80% compressor efficiency), °F. | 11 | .34 | 22 | 0.68 | .017 | .007 |

It is shown in Table IV that if the granular ice in the bed were maintained at +15° F. for example, and the compressor had a $\Delta P$ of 2 p. s. i., then the temperature at the outlet of the compressor would rise to 35° F. if there were substantially no entrained ice passing through the compressor with the ice. On the other hand, by fluidizing at turbulent velocities the entrainment will be about 0.1 lb. of ice/cu. ft. of air which will give a compression outlet temperature of only 16° F. or well below the melting point of ice. The concentration of entrained ice can be increased to 1 or to even 5 lbs./C. F. and a $\Delta t$ be lowered to .007° F.

A second advantage of minimizing temperature rise of the air by passing ice through the compressor is that the amount of water vapor frozen out of the air entering the chamber 10 is thereby minimized. For example, when cooling 1000 C. F. of saturated air from 30° F. down to 18° F., 0.179 lb. of water would be frozen out. However, when the same quantity of saturated air is cooled from 11° down to 10°, the water vapor frozen out would be only 0.007 lb. or 4% as large as in the first case. It is desirable to avoid freezing out water vapor because it turns principally to snow, which is harmful to good fluidization and heat transfer.

The superficial velocity of the gasiform fluid passing upwardly in each bed may be different in different beds. In this regard it is generally preferably to have a very turbulent bed of ice particles in the bed into which the foodstuff to be frozen is initially introduced or bed 20. This decreases the time that any single ice particle is in contact with the foodstuff. As a result, if the said foodstuff is above the melting point of the ice, the tendency for ice to stick to the foodstuff or stick to ice particles already frozen to the foodstuff is reduced. The superficial velocity in bed 26, through which the foodstuff passes last, is preferably made such as to produce a moderate degree of turbulence since the surface of the foodstuff is then frozen and there can be no further sticking of ice particles to the surface of the foodstuff. By using a lower superficial velocity through the bed less compressor power is required and less entrainment of ice from the surface of the bed takes place. Although heat transfer rates will be reduced, the rate of heat removal requirements are lower in this final bed.

The temperatures of the beds are preferably maintained in a gradient with bed 20 having the highest temperature and bed 26 having the lowest. This arrangement provides countercurrent heat transfer in relation to the foodstuff and, consequently, more efficient refrigeration. A further advantage is that the temperature difference between the fluidized ice particles and the foodstuff is minimized, which results in less moisture being frozen out of the gas film surrounding the surface of the foodstuff. This latter reason applies particularly to the incoming relatively warm foodstuff and the initial bed 20.

Ice particles stick to the surface of the foodstuff when the surface temperature of the foodstuff is above the melting point of the ice. Such ice stuck to the surface continues to melt until the said foodstuff surface temperature is lowered below the melting point of the ice. This melted ice is then refrozen by contact with additional ice chilled substantially below its melting point. A coating of solid ice on the surface of the foodstuff does not appreciably reduce the heat transfer rate because ice is a relatively good conductor of heat. It is preferable to decrease the thickness of the ice coating formed on the foodstuff by using a low temperature for the ice particles such as —20° F., and a highly turbulent condition. A layer of ice particles sticks to the melted ice but this does not interfere with heat transfer greatly because these ice particles merely act as "extended" surface for conducting heat from the fluidized particles to the foodstuff.

The frozen product will be covered with ice particles as described and therefore it is adaptable to pack the frozen product in chilled ice for storage rather than putting it in a wrapper. The presence of this ice coat will prove to the purchaser that the foodstuff has never thawed after first being frozen and will preserve the foodstuff from drying out during storage.

Ice particles which are removed from the system with the foodstuff are replaced by adding additional ice particles to the system. This ice is preferably added in compartment 20 since the ice sticking to the foodstuff was most likely taken from that compartment. Also, it is preferable to maintain the most pure ice in the compartment 20 since that ice is preferentially removed with the foodstuff.

In the foregoing paragraphs I have attempted to prove that fluidized ice particles are a novel direct contact cooling medium employed with novel technique. Also, the fluidized ice is more desirable for direct contacting with unpackaged foodstuffs than any other medium.

In an alternate process the foodstuff is introduced into a bed of ice particles which are fluidized as a turbulent bed and at the same time, refrigeration is supplied to the said bed. The bed of ice is initially maintained at a temperature of 10 to 20° F. and then the temperature of the bed is gradually lowered to its coldest temperature in the order of —15° F. to —5° F. In this manner the temperature of the foodstuff may be maintained very close to the temperature of the ice bed. This alternate has the advantage that the temperature difference between the ice and the foodstuff may be minimized by employing suitably long freezing periods in the cycle and thus drying out of the surface of the foodstuff is minimized. After the foodstuff has attained a suitably low temperature of from −15° to −5° F. it is removed from the bed of ice. This batch type of freezing process does not give as high a freezing capacity but it is useful for freezing unwrapped animal tissues used in surgery.

In another process the ice particles are replaced with granulated sugar. This kind of small fluidized particle would be especially applicable for freezing fruits and berries since the sugar sticking to the fruit or berries would not be objectionable. Also, the dehydrating effect of sugar would not be as objectionable with fruit and berries as it would be with vegetables and meats. Table salt could be used for freezing meats.

Figure 2 represents a vertical cross sectional view of freezing chamber 110. This chamber contains principal compartments 112, 114, 116, 118, 120, 122, and 124. Compartment 112 contains a bed of fluidized ice particles 126; compartment 114 contains bed 128; compartment 116 contains bed 130, and compartment 118 contains bed 132. Compartments 120, 122, and 124 contain gasiform fluid only or gasiform fluid with ice particles entrained therein. The lower ends of the compartments contain distribution grids 134, 136, 138, and 140 and bottoms 142, 144, 146, and 148 sloped to conduit connections 150, 152, 154 and 156.

Compartments 112 and 114 are separated by wall 158 which is solid except for 1 or more openings 160. Likewise, compartments 114 and 116 are separated by wall 162 having opening 164. Also, compartments 116 and 118 are separated by wall 166 which is solid except for 1 or more openings 168. Compartment 120 is enclosed principally by walls 170, 172, 174, and 176 and is in open communication with compartment 118 at one end and 122 at the other end.

Compartment 122 is enclosed principally by walls 174, 176, and 178 and is in open communication with compartments 120 at one end and 124 at the other. Compartment 124 is enclosed principally by walls 178, 180, and 182 and is open communication with compartments 122 at one end and 112 at the other.

At the common end of compartments 124 and 112 there is an opening to the atmosphere through which a wire mesh belt conveyor 186 passes into and out of the freezing chamber. It is preferable that this belt conveyor move through the freezing chamber in the order of compartment 124, compartment 122, compartment 120, bed 132, bed 130, bed 128, bed 126, compartment 112 and out the opening 184.

Pieces of foodstuff 188 are attached to the conveyor belt outside the freezing chamber and carried through the chamber in the order described above and the frozen foodstuff is then removed from conveyor.

Refrigerating tubes 190, 192, 194, and 196 are provided for refrigerating beds 126, 128, 130, and 132, respectively. These tubes are preferably immersed in the beds of ice above the distribution grids.

Gasiform fluid is injected into connections 150, 152, 154, 156 and passed upwardly through beds 126, 128, 130, and 132, respectively, at velocities sufficiently great to fluidize the ice particles as dense beds. The gasiform fluid from compartment 114 passes through multiple cyclone separator 115 thereby removing most of the entrained ice particles. Likewise, gasiform fluid from compartment 116 passes through multiple cyclone separators 117 into compartment 118. Gasiform fluid from compartment 118 passes into compartment 120, through compartment 122, through compartment 124 and out connection 198, through line 200 and to compressor 202. From said compressor the gasiform fluid passes through manifold line 204 to connections 150, 152, 154, and 156.

The quantity of gasiform fluid injected into connections 150, 152, 154, and 156 is regulated by valves 151, 153, 155, 157. It is preferable that the superficial velocity of gasiform fluid upwards through bed 132 be such that entrainment of ice from bed 132 into comparement 120 is minimized.

Chilled ice particles from bed 126 are passed through valve 208 and line 206 into line 200 and recycled in intimate admixture with the recycled gasiform fluid through the compressor 202 and into the bottom of the freezing chamber compartments. Such ice addition reduces the temperature increase of the gasiform fluid through the compressor due to its relatively high heat capacity.

The principal advantage of operation in accordance with the method illustrated in Figure 2 is that the foodstuff is first contacted with cold air substantially free of ice in an atmosphere of high humidity. The surface layer of foodstuff is thus frozen and is in a dry condition as it is immersed in the bed of ice. As a result practically none of the ice particles will stick to the surface of the foodstuff. A frozen product substantially free of ice is thus secured and high heat transfer coefficients are maintained between the ice particles and the foodstuff.

Although I have described my invention with a certain degree of particularity, it is understood that the present disclosure has been made only by way of example and that numerous modifications may be made by those skilled in the art without departing from the spirit thereof.

What I claim is:

1. A process for freezing relatively large foodstuffs by contacting said foodstuffs with relatively small solids, comprising maintaining a confined mass of said relatively small solids as at least one densely fluidized bed by passing gasiform fluid upwardly through said mass of solids, maintaining the temperature of said mass of solids below the freezing point of the foodstuff, supplying refrigeration into the said mass of solids continuously at a rate substantially equal to the rate at which refrigeration is absorbed by the foodstuff and the fluidizing gasiform fluid, and passing the foodstuff on a suitable support through the said mass of solids at a rate suitable to effect freezing of the foodstuff.

2. A process for freezing relatively large foodstuffs by contacting said foodstuffs with relatively small solids, comprising maintaining a confined mass of relatively small solids as at least one densely fluidized bed by passing a gasiform fluid upwardly through said mass of small solids, maintaining the temperature of said mass of solids below the freezing point of the foodstuff, maintaining the said relatively small solids in the zone immediately adjacent to the foodstuff in a violently turbulent degree of dense phase fluidization at least during the period that the temperature of the surface of the foodstuff is above the freezing point of the foodstuff, and passing the foodstuff on a suitable support through the said mass of solids at a rate suitable to effect freezing of the foodstuff.

3. A process for freezing relatively large foodstuffs by contacting said foodstuffs with relatively small solids comprising maintaining a confined mass of relatively small solids as at least one densely fluidized bed by passing gasiform fluid upwardly through the said mass of solids, maintaining the temperature of said mass of solids below the freezing point of the foodstuff, supplying refrigeration into the said mass of solids continuously at a rate substantially equal to the rate at which refrigeration is absorbed by the foodstuff and the fluidizing gasiform fluid, and passing the foodstuff on a suitable support through the said mass of solids at a rate suitable to effect freezing of the foodstuff, in which the said foodstuff has bare surfaces and in which the said solids are edible.

4. A process for freezing relatively large foodstuffs by contacting said foodstuffs with relatively small solids comprising maintaining a confined mass of relatively small solids as at least one densely fluidized bed by passing gasiform fluid upwardly through said mass of solids, maintaining the temperature of the said mass of solids below the freezing point of the foodstuff, supplying refrigeration into said mass of solids continuously at a rate substantially equal to the rate at which refrigeration is absorbed by the foodstuff and fluidizing gasiform fluid, and passing the foodstuff on a suitable support through the said mass of solids at a rate suitable to effect freezing of the foodstuff, in which the said foodstuff is meat having bare surfaces and in which the said solids consist of table salt.

5. A process for freezing relatively large foodstuffs by contacting said foodstuffs with relatively small solids comprising maintaining a confined mass of said relatively small solids as at least one densely fluidized bed by passing gasiform fluid upwardly through said mass of solids, maintaining the temperature of the said mass of solids below the freezing point of the foodstuff, supplying refrigeration into said mass of solids continuously at a rate substantially equal to the rate at which refrigeration is absorbed by the foodstuff and fluidizing gasiform fluid, and passing the foodstuff on a suitable support through the said mass of solids at a rate suitable to effect freezing of the foodstuff, in which the said foodstuff is fruit having bare surfaces, and in which the said solids consist of granulated sugar.

6. A process for freezing relatively large foodstuffs by contacting said foodstuffs with relatively small solids, comprising maintaining a confined mass of relatively small solids as at least one densely fluidized bed by passing gasiform fluid upwardly through said mass of solids, maintaining the temperature of said mass of solids below the freezing point of the foodstuff, supplying refrigeration into said mass of solids continuously at a rate substantially equal to the rate at which refrigeration is absorbed by the foodstuff and by the gasiform fluid, withdrawing a portion of the said fluidizing gasiform fluid emerging from the upper surface of said mass of solids, compressing and recycling said portion of gasiform fluid into the bottom of the said mass of solids, and passing the foodstuff on a suitable support through the said mass of solids at a rate suitable to effect freezing of the foodstuff.

7. A process for freezing relatively large foodstuffs by contacting said foodstuffs with relatively small solids, comprising maintaining a confined mass of said small solids as a densely fluidized bed by passing a gasiform fluid upwardly through said mass of solids, maintaining the temperature of the said mass of solids below the freezing point of the foodstuff, withdrawing at least a portion of the said fluidizing fluid emerging from the upper surface of the said mass of solids, compressing and recycling said portion of said fluidizing fluid into the bottom of the said mass of solids, withdrawing a portion of the solids from the said mass of solids, introducing said withdrawn solids in intimate contact with the said recycled gasiform fluid into the said bottom of said mass of solids and passing the foodstuff on a suitable support through the said mass of solids at a suitable rate to effect freezing of the foodstuff.

8. A process for freezing relatively large foodstuffs by contacting said foodstuffs with relatively small solids, comprising maintaining a confined mass of relatively small solids in a plurality of densely fluidized beds by passing gasiform fluid upwardly through said mass of solids, maintaining the temperatures of said mass of solids below the freezing point of the foodstuff, supplying refrigeration into said mass of solids continuously at a rate substantially equal to the rate at which refrigeration is absorbed by the foodstuff and the gasiform fluid, and passing the foodstuff serially on a suitable support through said plurality of beds at a rate suitable to effect freezing of the foodstuff.

9. A process for freezing relatively large foodstuffs by contacting said foodstuffs with relatively small solids, comprising maintaining a confined mass of relatively small solids in a plurality of densely fluidized beds by passing gasiform fluid upwardly through said mass of solids, maintaining the temperature of said mass of solids below the freezing point of the foodstuff, supplying refrigeration into said mass of solids continuously at a rate substantially equal to the rate at which refrigeration is absorbed by the foodstuff and the gasiform fluid, maintaining the average rate of migration of the solids from one bed to another substantially negligible, and passing the foodstuff serially on a suitable support through said plurality of beds at a rate suitable to effect freezing of the foodstuff.

10. A process for freezing relatively large foodstuffs by contacting said foodstuffs with relatively small solids, comprising maintaining a confined mass of relatively small solids in a plurality of densely fluidized beds by passing gasiform fluid upwardly through said mass of solids, maintaining the temperatures of said mass of solids below the freezing point of the foodstuff, supplying refrigeration into said mass of solids continuously at a rate substantially equal to the rate at which refrigeration is absorbed by the foodstuff and the gasiform fluid, passing the foodstuff serially on a suitable support through said plurality of beds at a rate suitable to effect freezing of the foodstuff, and maintaining a violently turbulent degree of dense phase fluidization in the first bed that the foodstuff contacts and moderately turbulent fluidization in the remaining beds.

11. A process for freezing relatively large foodstuffs by contacting said foodstuffs with relatively small solids, comprising maintaining a confined mass of relatively small solids in a plurality of densely fluidized beds by passing gasiform fluid upwardly through said mass of solids, maintaining the temperatures of said mass of solids below the freezing point of the foodstuff, supplying refrigeration into said mass of solids continuously at a rate substantially equal to the rate at which refrigeration is absorbed by the foodstuff and the gasiform fluid, passing the foodstuff serially on a suitable support through said plurality of beds at a rate suitable to effect freezing of the foodstuff, and maintaining the temperatures of the said plurality of beds progressively lower in the direction in which the foodstuff is passing.

12. A process for freezing relatively large foodstuffs by contacting said foodstuffs with relatively small solids, comprising maintaining a confined mass of relatively small solids in a plurality of densely fluidized beds by passing gasiform fluid upwardly through said mass of solids, maintaining the temperature of said mass of solids below the freezing point of the foodstuff, supplying refrigeration into said mass of solids continuously at a rate substantially equal to the rate at which refrigeration is absorbed by the foodstuff and the gasiform fluid, passing the foodstuff serially on a suitable support through said plurality of beds at a rate suitable to effect freezing of the foodstuff, maintaining the temperatures of the said plurality of beds progressively lower in the direction in which the foodstuff is passing, segregating the gasiform fluid leaving the upper surface of each of said beds, and recycling at least a portion of the gasiform fluid leaving one of said beds back to the bottom of the same bed.

13. A process for freezing relatively large foodstuffs by contacting said foodstuffs with relatively small cold solids, comprising maintaining a confined mass of relatively small solids in at least one densely fluidized bed by passing a gasiform fluid upwardly through said mass of small solids, maintaining the temperature of the small solids below the freezing point of the foodstuff, contacting the foodstuff to be frozen countercurrently with the major portion of the said gasiform fluid leaving the upper surface of the said mass of fluidized solids in such a manner as to freeze at least the outside surface of the foodstuff, recycling at least a portion of the said gasiform fluid back to the bottom of at least one said fluidized bed, and passing the foodstuff on a suitable support through the fluidized solids at a rate suitable to effect freezing of the foodstuff.

14. A process for freezing relatively large unpackaged foodstuffs by contacting said foodstuffs with relatively small ice particles, comprising maintaining a confined mass of said relatively small ice particles as at least one densely fluidized bed by passing gasiform fluid upwardly through said mass of ice particles, maintaining the temperature of said mass of ice particles below the freezing point of said foodstuff, supplying refrigeration into the said mass of ice particles continuously at a rate substantially equal to the rate at which refrigeration is absorbed by the foodstuff and the fluidizing gasiform fluid, recycling at least a portion of the gasiform fluid leaving the upper surface of said mass of ice particles back to the bottom of at least one said fluidized bed of ice particles, and passing the unpackaged foodstuff on a suitable support through the said mass of ice particles at a rate suitable to effect freezing of the foodstuff.

15. A process for freezing relatively large unpackaged foodstuffs by contacting said foodstuffs with relatively small ice particles, comprising maintaining a confined mass of relatively small ice particles in a plurality of densely fluidized beds by passing gasiform fluid upwardly through said beds of ice particles, maintaining the temperature of said mass of ice particles below the freezing point of the foodstuff, supplying refrigeration into said mass of ice particles continuously at a rate substantially equal to the rate at which refrigeration is absorbed by the foodstuff and by the gasiform fluid, passing the unpackaged foodstuff serially on a suitable support through said plurality of beds at a rate suitable to effect freezing of the foodstuff, and maintaining the temperatures of said plurality of beds progressively lower in the direction in which the foodstuff is passed through said beds.

16. A process for freezing relatively large unpackaged foodstuffs by contacting said foodstuffs with relatively small cold ice particles, comprising maintaining a confined mass of relatively small ice particles as at least one densely fluidized bed by passing gasiform fluid upwardly through said mass of ice particles, maintaining the temperature of said mass of solids below the freezing point of the foodstuff, supplying refrigeration into said mass of ice particles continuously at a rate substantially equal to the rate at which refrigeration is absorbed by the foodstuff and the gasiform fluid, passing the unpackaged foodstuff serially on a suitable support through said plurality of beds at a rate suitable to effect freezing of the foodstuff, contacting the unpackaged foodstuff to be frozen with at least a portion of the fluidizing gasiform fluid leaving said mass of ice particles, and recycling substantially all of the fluidizing gas back to the bottom of said mass of ice particles.

BRADFORD E. BAILEY.

References Cited in the file of this patent

UNITED STATES PATENTS

| Number | Name | Date |
| --- | --- | --- |
| 1,905,602 | Patterson | Apr. 25, 1933 |
| 2,263,452 | Birdseye | Nov. 18, 1941 |
| 2,418,746 | Bartlett | Apr. 8, 1947 |
| 2,475,255 | Rollman | July 5, 1949 |
| 2,479,496 | Keith | Aug. 16, 1949 |
| 2,506,317 | Rex | May 2, 1950 |